Jan. 5, 1965
N. B. WALES
3,163,990
CLOSED THERMAL CIRCUIT INCORPORATING A THERMAL
DILATING AND PULSING UNIFLOW COMPRESSOR
AND A SYSTEM OF USAGE THEREFOR
Filed June 27, 1963
4 Sheets-Sheet 4
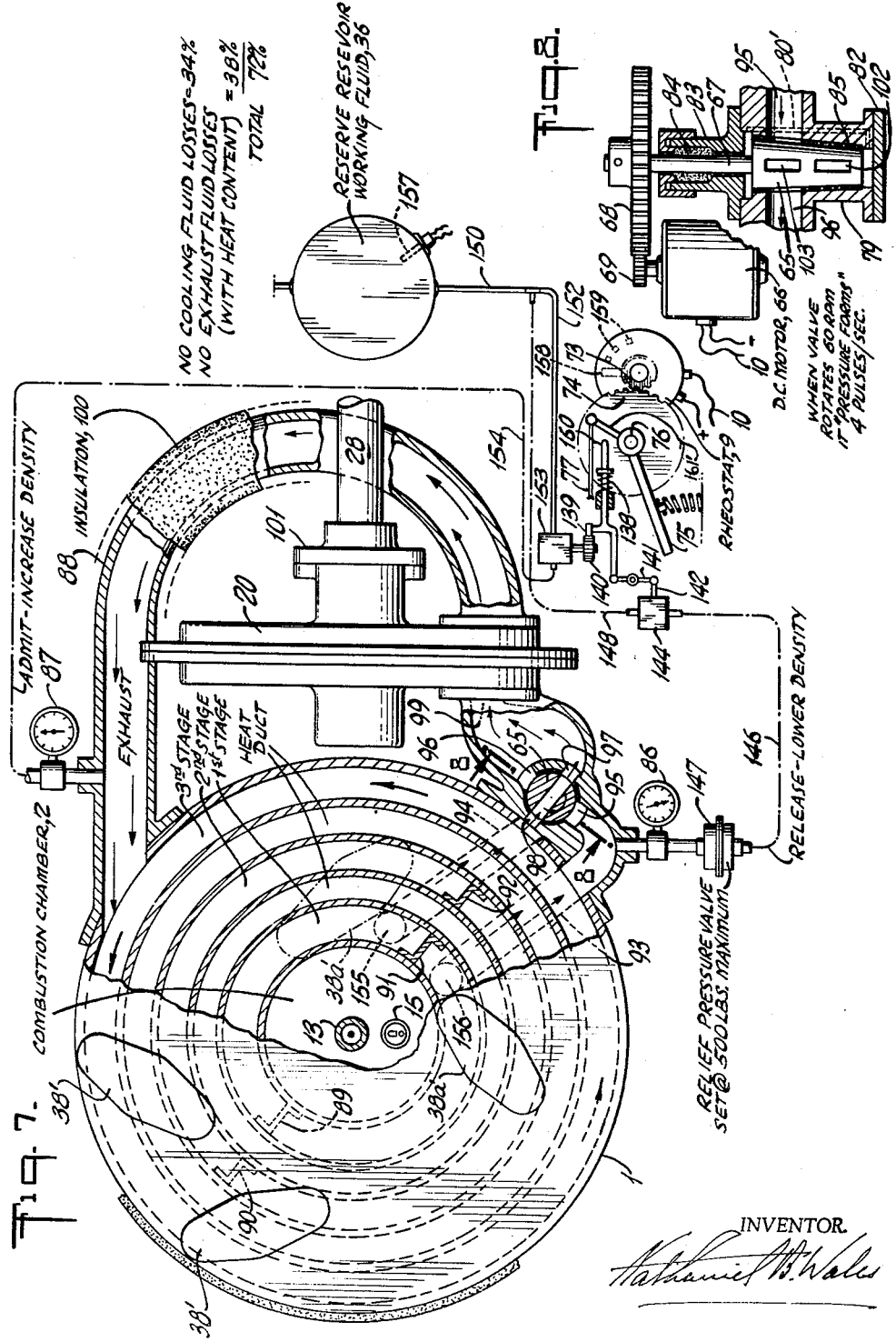
INVENTOR.
*Nathaniel B. Wales*

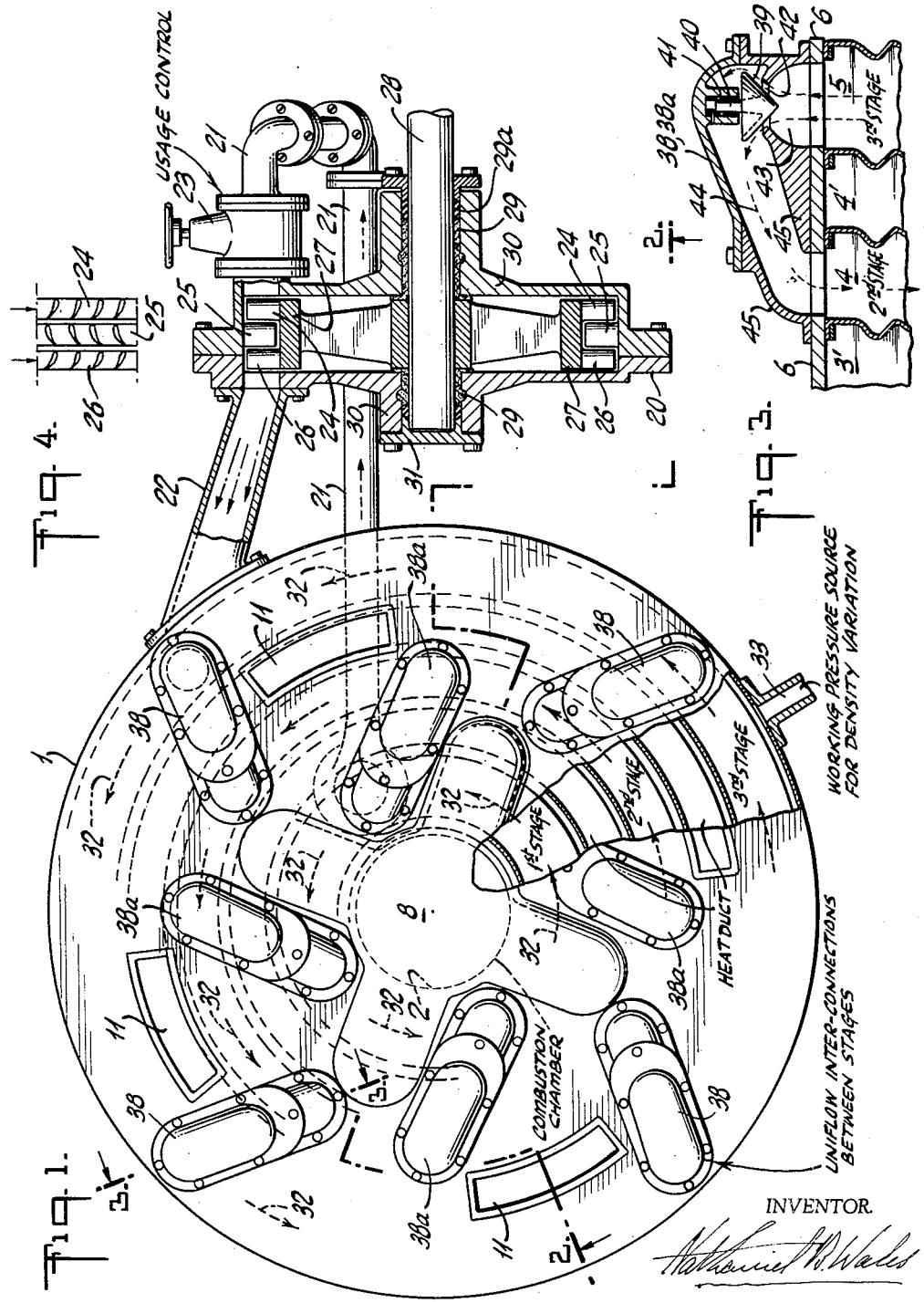

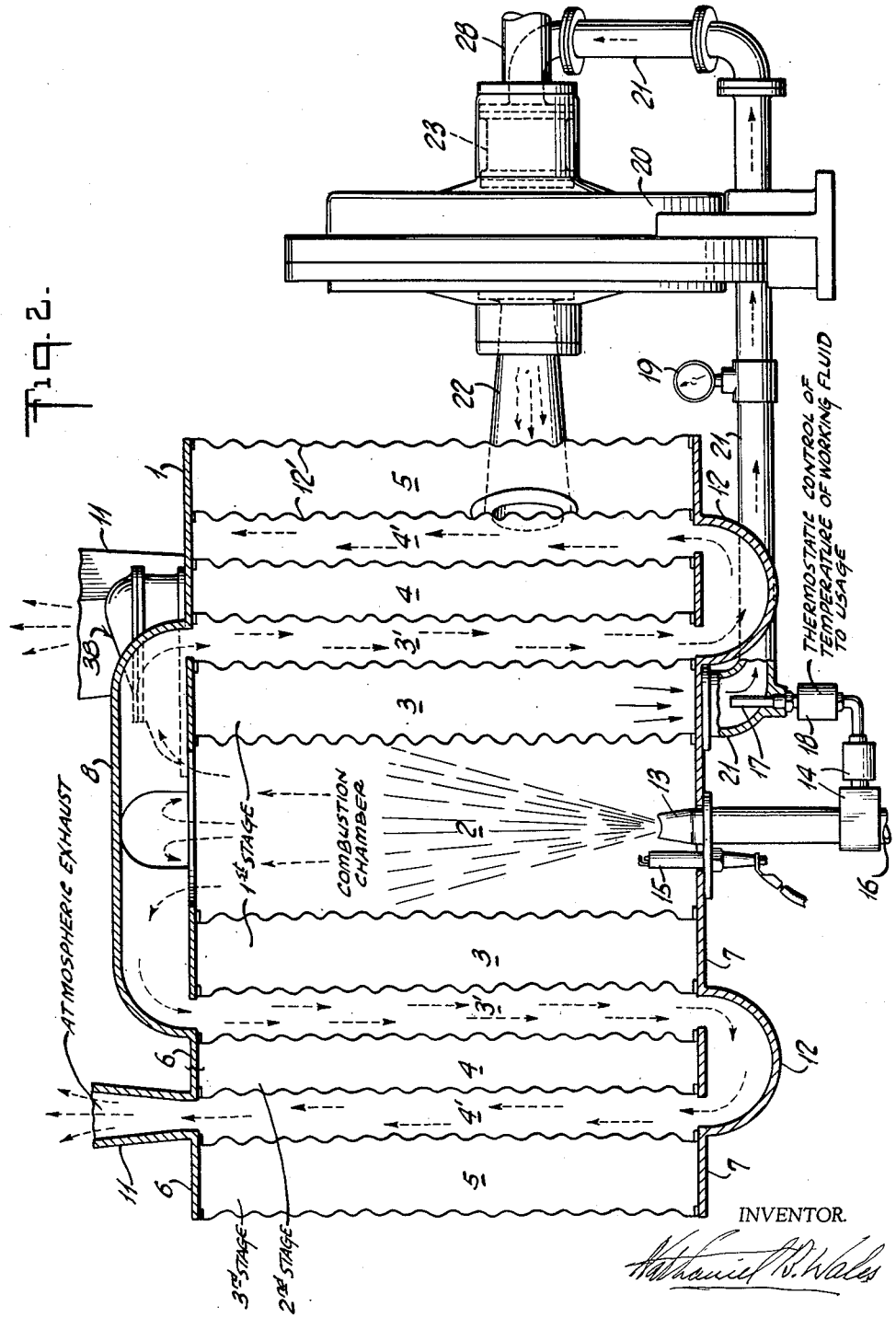

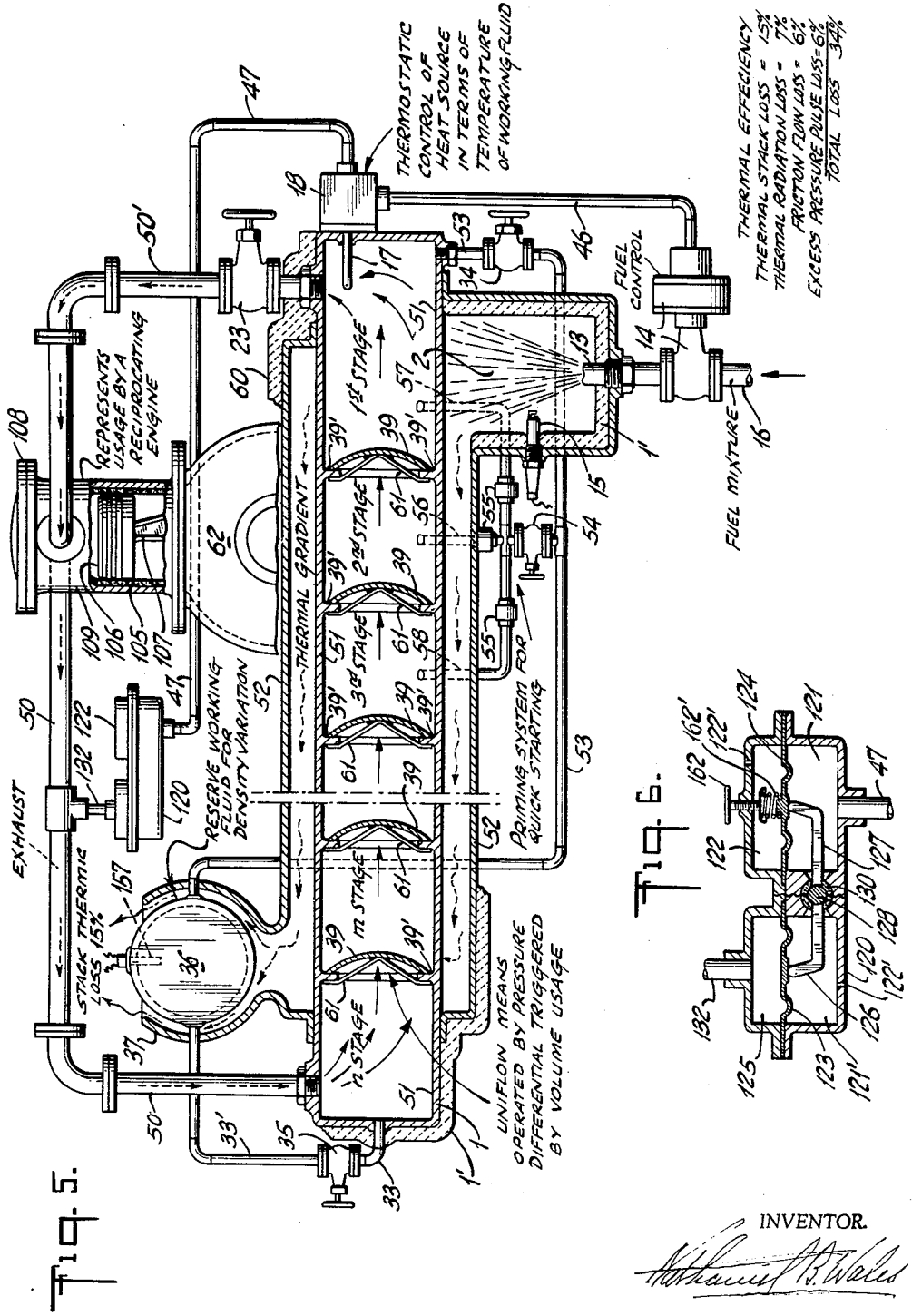

3,163,990
CLOSED THERMAL CIRCUIT INCORPORATING A THERMAL DILATING AND PULSING UNIFLOW COMPRESSOR AND A SYSTEM OF USAGE THEREFOR
Nathaniel B. Wales, 230 E. 48th St., New York, N.Y.
Filed June 27, 1963, Ser. No. 290,978
18 Claims. (Cl. 60—59)

This invention relates to a closed cycle heat engine in which high pressures of a working fluid are achieved without change-of-state by pulsing the fluid through a chain of check valve connected chambers along which a descending temperature gradient is maintained in counter flow relation with the dilation chain's working fluid flow.

Throughout this specification and the appended claims whenever reference is made to dilation, it is intended that this term implies dilation of a gas by heat to increase the pressure thereof and not physical expansion of the gas as such. In the present inventive disclosure a closed system is involved and in such a closed system dilation means compression. Whenever a gas is dilated by heat in a constant volume chamber an increase in pressure will result, which increase is proportional to the change in temperature pursuant to Charles' law.

The principle of this system depends on the arrival of a pressure relief pulse at the exit check valve of a given heated chamber to cause a momentary conversion of a portion of the heat energy of the fluid in said chamber into a fluid velocity whose momentum carries most of said fluid into the next higher temperatured chamber.

This chain of dilation chambers thus forms a thermal compressor whose only moving parts are the working fluid and the uniflow check valves. Since heat is used to generate the pulsing velocities, the efficiency of this compressor will in part depend on the efficiency with which these velocities are reconverted into useful pressure differentials. For this reason, in the engineering execution of this invention, careful attention must be given to the aerodynamic design of the chambers and uniflow valves.

The foregoing pulses necessary to trigger the chains-fluid-transfer between chambers may be supplied by a reciprocating piston engine, as it intermittently demands a usage of its pressurized working fluid supply. Thus it becomes the usage device for converting the pressure of the fluid working medium into mechanical work. In this case, the exhaust of this piston engine is reintroduced into the low pressure and temperature end of the dilation chain to conserve its residual heat and maintain a closed ducting circuit.

Alternatively and especially when it is desired to use a turbine as the usage device, an artifical pulsation may be introduced into the closed ducting circuit by the use of a motor driven interrupter or transfer valve positioned between the dilation chain compressor and the turbine. Again, the exhaust from the turbine is regenerated into the foregoing compressor to maintain a closed circuit. It is evident that without using the unidirectional momentum of the transferring fluid, there could not be a pressure relief pulse to trigger the adjacent stage and from one to the other along said chain.

This invention also relates to a thermal means of generating a gaseous pressure in units of all sizes and for all usages, wherein steam, always however, under a degree of superheat or a monatomic or a multiatomic gas like the composition of the Freons or air may serve as the working-fluid in this completely closed cycle.

This cycle is characterized by having no condensing element when employed in a power output usage, there being no necessity for a change-of-state in its working-fluid's gaseous state as it passes through its operative closed circuit. The working-fluid requires no primary or secondary heat interchanger or thermal regenerator and the compressor is static except for periodical moving closure means therein. It compresses by thermal dilation based on Charles' law.

In an Otto cycle or a diesel cycle engine the heat losses from exhaust heat content are from 35 to 40%. The heat losses from cooling are from 30 to 37%. Whereas the heat dissipations in this completely closed pulsing cycle occur from these sources:

|   | Percent |
| --- | --- |
| (1) Radiation and friction-flow losses | 13 |
| (2) Stack temperature losses | 15 |
| (3) Heat dissipated in generating excess-pressure pulses | 8 |
| (4) Heat converted into useful kinetic energy | 64 |

Any prime source of heat can be utilized in this invention, as for instance, solar heat, atomic fission, combustion, geothermic heat or other possible sources such as relatively low temperature waste heats from other industrial usages.

As an illustrative embodiment of this cycle, I have chosen a closed-cycle gaseous turbine power output unit and a reciprocating engine as the usage units. The essence of this invention resides in a heat-dilating pulsing-flow compressor and combined heater.

Suppose we have an extended heat absorbing working-fluid flow path composed of a series of manifolds or chambers which are subjected to an increasing gradient of temperature. Starting from the working-fluid's exhaust from its point of use and re-entry into the initial receiving chamber in said series of chambers, the receiving chamber is subject to comparatively low heating or even neutral temperatures, while at the final or delivery-end chamber, said flow-path is subjected to relatively high temperatures, these temperature extremes defining a temperature gradient there between.

This heat absorbing flow-path is in counter-flow heat absorbing relation with its heating source-flow. This flow-path is subdivided periodically into gas-tight chambered divisions or pressure stages along its extended length. The subdivision means are in approximate operative sequence. As shown in the illustrative embodiments of the invention, this periodic subdivision is created by uniflow-valves of the check-valve type or by positive operating valves actuated by independent means as to their opening or closing to form pulsing flows, said automatic valves interconnecting and disconnecting each adjacent chambered division in a tempo-pressure differential operative relationship.

Suppose in such a periodically subdivided series of said chambered flow-path, we consider the automatic type of uniflow valved-created-subdivisions to be (8) eight in number; in other words, there are eight stages, No. 1 being the last chambered division at the delivery or supply end of said series and which is closest to the source of heat or arranged to be in an equivalent graduated temperature gradient and therefore in an ambient of the highest temperature of all of said series of valved subdivisions therein.

The outlet of No. 1 is in direct connection with a gaseous operated turbine or any other type of fluid-expansion prime mover or other useful heat-processing system, such as even a refrigerative effect system, as its source of working-fluid supply. Now due to the usage-flow to such a using system in a given unit of time, the pressure existing in chambered subdivision No. 1 falls to a degree to thereby open the uniflow-valve interconnecting it with chamber No. 2 which is subject to a slightly lower temperature in the operative decreasing gradient of temperature.

Division No. 2 replenishes in volume division No. 1 based on the time-scale of a momentary pressure differential which depends on several factors, among them being the relative volume of chamber No. 2 to chamber No. 1 so that its interconnecting uniflow-valve permits an adequate flow-through while open, which specific volume of working-fluid is further dilated by its passage into an ambient of higher temperature as it flows into and through chamber No. 1. This initial flow by such pressure-drop is triggered repeatedly down through the series of valved-divided chambered divisions to chamber No. 8 which in turn permits the receiving of the exhaust from the prime mover or other working-fluid usage systems by such a pulsing displacive uniflow as is instituted as and when said valves open and close more or less in timed seriatim by the relative pressure differential induced by the reflected sequential usage of the working-fluid from pressure stage to pressure stage. The time it takes a given volume of working-fluid to pass through such a pulse-flow thermal dilating duct is obviously of longer duration than if this duct were not periodically subdivided; this means a longer heat-transfer heating period which is beneficial.

It is obvious, however, in view of the turbine exhaust, as per one of the illustrative embodiments of usage of the invention which employs a continuous exhaust, that there might be a build up in pressure in the exhaust receiving low temperature and low pressure chamber No. 8 during this interval of pulsing flow. In this case, a critical rising pressure in No. 8 would operate the uniflow valve between chamber No. 8 and chamber No. 7 and chamber No. 6 and possibly enter chamber No. 5, but this action would in no wise affect the pulsing action nearer to the working-fluid high pressure end of the series except to possibly alter their tempo from its normal rhythm. However, I provide an automatic and rapid response to such a condition which is an increase in the degree of heat generated in the heat-source which will increase the mean dilation-factor per unit of time per divisional chamber or pressure stage. This in turn increases the tempo of said uniflow valve pulse-flow action, due to an increased ratio of dilation, to maintain the increased necessary volume of flow through the heat-dilating compressor. It is to be noted that with the use of Freon C–318 as the working fluid, a temperature rise of one (1) degree F. of the Freon gas in any one chambered division or stage increases the pressure therein by 2.3 lbs. gauge.

This periodicity of pulsed-flow by this valve action may be of an order of three or more per second depending on the volume of working-fluid supplied to the prime mover in unit time and other factors to be considered. The resulting periodicity of pressure pulses of working-fluid in transit through this heat-dilating compressor as above described depends on the volume of usage-flow per unit time to supply the prime mover, but also factors such as the respective heat absorbing surfaces of each subdivision and their respective volumes and especially the mean temperature of heat-flow impinging on said chambered series from the heat source in its thermal gradient of flow also come importantly into the equation. In brief, this novel system must have a proper proportionate design and heat absorption factor for a required output in any unit of time.

It is thus seen that with basically well proportioned heat-absorbing chambered divisions in the said heat-path and with a plurality of uniflow valves in parallel flow relation, or their equivalent in one large uniflow valve as will be seen in the FIG. 5 embodiment, high power output can be attained from a very compact unit and with an operative thermal efficiency higher than any other known thermal cycle.

The heat-dilating compressor as is seen in FIG. 1 and FIG. 2 is 20 inches in diameter and 22 inches high and has a heat transmitting area between the said heat-absorbing flow-path and the counter-flow heating duct of 43 sq. feet of area.

Using a multistage turbine in the power unit and with, for instance, Freon–C318 as the working fluid, the Freon gas could be delivered to the turbine by the above described thermal dilating pulse-flow compressor at a temperature of 285 degrees F. and at a pressure of 500 p.s.i.g., see Dupont Freon–C318 P.T. tables, and would be exhausted from the turbine, depending on its number of expansion stages in said turbine, into the re-entry of subdivision No. 8 at an approximate temperature of 180 degrees F. and at a pressure of 120 p.s.i.g., to again transit directly through my temperature-pressure-dilation-pulse "ladder." Freon–C318 is many times a heavier gas than air, which makes it desirable as a turbine's working-fluid. It is also to be noted that density in a gaseous working-fluid enhances heat-interchange therein. Using certain other gases as the working-fluid, a base-pressure, that is, the initial density of the working-fluid, could be varied from 50 to 200 lbs. gauge automatically as the load on the reciprocating engine or turbine increased or decreased to attain a wide range of power output. But with Freon–C318 a fraction of the above base-pressure increase would satisfy desirable torque variables due to its great increase in pressure per degree Farenheit of its temperature increase which in each stage amounts to 2 lbs. gauge per degree of temperature increase. Even without such increase in the base-pressure but with only a variation in the mean temperature gradient in the compressor using Freon–C318 will thus permit the use of a simple transmission without gear ratios in automotive service with this power package.

Among the objects of this invention are:

(a) A thermic closed cycle composed of a combined heat-dilating uniflow-pulsing compressor and heater therefor, together with a system of utilization of the high temperature high pressure working-fluid generated by said heat-dilating compressor wherein the total exhaust-heat content from said utilization system is in a direct re-entry relation into the low-temperature, low pressure end of said heat-dilating compressor without a change-of-state, resulting in a high thermal efficiency.

(b) Using the closed thermic cycle as outlined in (a) a prime mover of compactness for its power output due to relative high operating pressure and density of working-fluid.

(c) A power plant giving wide torque variation.

(d) An automatic control system to vary the tempo of the pulse flow-rate in said heat-dilating compressor by varying the temperature of said working-fluid as generated by said compressor by increasing or decreasing the generation of the B.t.u.'s in the heater in unit time, as well as a control system which, in accordance with the degree of exhaust back pressure from the usage system, varies the B.t.u.'s as generated in the heater in unit time.

(e) A closed circuit turbine power plant operating at high efficiency without the necessity of using expensive high temperature heat-resisting steel, as an example, when using as its working-fluid Freon–C318.

(f) An automotive power plant of quiet operation.

(g) Means to prime the heat dilating compressor with working-fluid for quick and certain self-starting the instant heat is generated in the heater.

(h) In accordance with the modification of this completely closed pulsing cycle as it is herewith taught to employ a positively actuated pulse creating valve between the stages of the thermal dilating compressor to induce a pulse-rate in the compressor compatible with a wide variation of usage-volume supplied to the usage system in closed circuit relation therewith, together with a coordinated control of the heat source to insure adequate dilation. The greater the demand by usage system the faster the pulsing action of the positive operated valves and the greater the heat generation in unit time.

(i) A closed circuit power generating system wherein there is no need to use oil as a lubricating medium, the oil being deleterious to the normal and efficient heat transfer factor by its coating action on metallic heat transmission surfaces.

(j) Further objects are inherent in the specification and drawings.

Turning to the drawings:

FIGURE 1 is a plan view with portions broken away and shown in section of an embodiment of my invention wherein the thermal compressor is shown to have three pressure building stages of thermal compression by dilation of the gaseous working fluid. A turbine engine is shown as an illustrative usage system of the pressurized working-fluid as supplied by the compressor in a completely closed cycle.

FIGURE 2 illustrates the same unit as is seen in FIGURE 1, but is shown in sectional elevation which sectionalized view is taken on dotted line 2 in FIGURE 1.

FIGURE 3 is a sectional elevation taken on line 3—3 in FIGURE 1, showing one embodiment of the uniflow valve structure which interconnects the respective pressure building stages or chambered divisions of the compressor.

FIGURE 4 is a view of the two stage turbine engine buckets in plan.

FIGURE 5 is a schematic view in elevation of the invention to illustrate the various circuits and control mechanism associated with the thermal uniflow pulsing compressor, including a reciprocating expansion engine as the usage system.

FIGURE 6 is a sectional view in elevation of the diaphragm actuated exhaust pressure sensing device responsive to undue increase of back pressure of the exhaust gas from the usage system which controls an increase of heat generation.

FIGURE 7 is a plan view, cut away in part to show essential sections of the dualized pressure building stages in the compressor to supply one or more positively actuated pulse forming ported valves. One valve only is shown. This modification was conceived to attain a wide variation of pulse generation as demanded for acceleration in automative service.

FIGURE 8 is a fragmentary sectional view in elevation showing a positively actuated pulse forming valve of the type shown in FIGURE 7.

Referring to the drawings:

In FIGURE 1, numeral 1 is the combined thermal pulsing compressor for a gaseous working fluid and an axially positioned combustion chamber, numeral 2. The compressor operates under Charles' law due to its intermittent subdivisions, forming periodic constant volume chambers in accordance to Charles' law which states that, "when the volume of a given mass of gas is held constant, the change of pressure of the gas is proportional to the change in its temperature."

One of the desirable gases that is adaptable to this pulsing closed cycle is the recent industrial product Freon C–318, which has a large dilation factor, which by its rise of each 1 degree F. in temperature, the pressure of the gas, Freon C–318, rises 2.3 lbs. gauge. Freon C–318 is a non-combustible, heavy and stable gas. It is non-toxic. Its molecular weight is 200. Boiling point is 21.5 degrees F. Latent heat of vaporization 46. Specific heat of vapor .189. Freezing point can be lowered to −53 degrees C. according to Dupont tables.

My thermal pulsing compressor is shown in FIGURES 1, 2, and 7 in a very compact form, especially designed for automotive installations. In these embodiments it comprises a series of annular walls or sections. Every other one of the annular formed chambers is a heating flue, viz in FIGURE 2, 2 is the combustion chamber, the products of combustion rising therein and are deflected by cowling 8 into the annular flue 3' and are again deflected by cowling 12 upward into annular flue 4' to stack outlets 11. Whereas the working fluid heating duct is in counter-flow relation with said heating flues and also the working fluid is subjected to a rising temperatured gradient thereby; see FIGURE 1. It enters from the usage system, in this case as illustrated, from the gaseous expansion turbine 20, as the turbine's exhaust, by exhaust pipe 22, see FIGURE 2, and is tangentially directed by exhaust pipe 22 into the low temperature and low pressure chamber or stage, indicated as 3rd stage and as seen in FIGURE 2 as annular chamber 5. By this tangential direction of entry, the exhaust working fluid circulates around annular chamber 5 as seen in FIGURE 1 by arrow 32 to contact with the inner heated wall of stage 3 which also forms part of heating flue 4'.

The uniflow valves which interconnect stage 3 to stage 2 to stage 1 are shown in FIGURE 1, but are seen only as the covers of same, bearing the numerals 38 and 38a, there being a plurality of them between each respective stage. The numeral 38 shows those between stage 3 and 2, while the numeral 38a indicates those that interconnect stage 2 to stage 1. Referring to FIGURE 3 which is a sectional elevation taken along line 2 in FIGURE 1, is seen one embodiment of this uniflow valve structure.

The numeral 39 is the uniflow valve, seating on seat 42, with valve stem 40 guided by a contacting sleeve 41 formed of a self-lubricating composite of carbon and graphite, which is a self-lubricating industrial product. Valve 39 commands the interconnecting passage numeral 43 connecting the 3rd stage with the 2nd stage and bridging over heating flue 4'. A top cover 38–38a is secured to base casting 45. This view also shows the top plate 6 that closes the top of the series of annular partitioned formed chambers 3, 3', 4, 4', and 5, with plate 7 at the bottom of compressor 1 in the same capacity.

The uniflow valves interconnecting pressure-building stage 2 to the high temperature and high stage 1 are identical to the uniflow valve just described. The 1st stage or chamber 3, is seen to be adjacent to combustion chamber 2, see FIGURES 1 and 2.

Combustion chamber 2 has a burner nozzle 13 supplied with a combustible mixture by pipe 16. Present is an initial ignition spark plug 15, as the combustion is continuous and controlled in varying degree of B.t.u.'s per unit time by valve 14 as dictated by the thermostatic control systems embracing numerals 18 and 17. The temperature sensing element thereof, is finger 17 and is positioned in the high temperature high pressure supply pipe 21 entering into the base of the 1st stage and directly interconnected into the turbine's 20 supply port. A control or throttle valve 23 is interposed in connecting pipe 21.

The temperature sensing finger 17 in pipe 21, reflects the temperature of the working fluid leaving the 1st stage. This temperature indexing also indicates the corresponding pressure of a working gaseous fluid, such as Freon C–318.

In accordance with the P.V.T. tables of this gas, it is seen that if the temperature of the gas as it leaves the 1st stage is at a temperature of 285 degrees F., its pressure is 500 p.s.i.g. In this manner, by temperature indexing the pressure is controlled. If the temperature rises as indicated by finger 17, this heat condition starts to close valve 14 and vice versa.

Therefore, if the turbine 20 is supplied with Freon gas at 500 lbs. gauge pressure, ignoring for the moment the throttling of control valve 23, and if the two stages of expansion of turbine buckets of turbine wheel 27, as shown in FIGURE 7, expand this working fluid from 500 lbs. gauge to 120 lbs. gauge and at a corresponding temperature of 180 degrees F., this gaseous working fluid at this pressure and temperature enters the lowest temperature and pressure stage, stage 3 of the compressor, at this temperature and pressure and with, of course, the heat content thereof.

Now, it is to be noted that the pressure pulses occurring in the compressor when using uniflow automatic valves instead of independently positively actuated valves, as will be described and illustrated further on in the specification and drawings, are pulses which depend basically on the usage volume, there being, of course, other salient factors as will be described. However, if there is no usage volume withdrawal from the compressor, there is no pulsing displacement of the gaseous working fluid through the compressor possible in view of the increasing thermal gradient of temperature existing against such a flow to the compressor's outlet.

Now, there are a number of conditions and factors which in their coordination determine the pressure variation extremes which define the vertical amplitude, that is, its base and peak in each of these pulsing displacements through the automatic uniflow valves.

The first factor is the volume of working fluid in pulse form and in unit time that passes through throttle or control valve 23. In other words, it is the rate of supplying displacement as compared to the rate of dilation of the comparatively volatile gaseous working fluid existing in the plurality of divisions and intermittently contained in the compressor's stages.

If, under a given opening of control valve 23 as compared to said rate of dilation as then exists, the volume of the dilating working fluid exceeds the volume passing through said valve 23, then the magnitude in pressure variation of the pulses will decrease and their periodicity will increase.

Therefore, there is a vital relative capacity relationship between the compressor's mean dilation in unit time and the volume of gas passing into the usage system in unit time.

The two factors which will increase the displacing output under pressure in unit time from the compressor are:

1st, the mean temperature differential as it may exist along the thermal gradient of heat applied to said divisional stages of the compressor.

2nd, an arbitrary increase of density in the working fluid in transit through the pulsing compressor because of the increased density having superior heat absorption as impressed thereon by the annular heating flues 2, 3' and 4'. Not only this factor, but also the increase of density of the working fluid as and when impinging against the blades 24 and 26 of turbine 20 give a greater torque to shaft 28.

A pressure gauge 19 is shown in pipe 21. The exhaust pipe 22 connects the exhaust port of the turbine directly with the compressor's stage 3 as seen in FIGURE 1. Stage 3 is defined by the circumferential outer wall and inner wall, see FIGURE 2, by numeral 12' and further defined by numeral 5. Exhaust pipe 22, by its angular structure, permits the exhausted working fluid to enter stage 3 in a circumferential directed flow to thus afford an extensive circulative contact therewith. This extensive circulative theme is carried out, as well, by the diagonal position of the uniflow valves 38 and 38a, see FIGURE 1.

If the turbine 20 exhausts at a back pressure of 120 degrees F., which, of course, depends on the number of expansion stages incorporated in the specific turbine structure under consideration, the working fluid, being Freon C–318, is supplied to the turbine 20 at 285 degrees F. and at an average pressure caused by its pulsing action from stage 1 through supply pipe 21 at say 465 lbs. pressure gauge.

When an inordinate back pressure above 120 lbs. gauge occurs in the exhaust pipe I have provided means for controlling this pressure. This control means is shown in FIGURE 5, which is a schematic view of the invention in assembly and adapted for a large powered unit. In this FIGURE 5 disclosure the usage factor is shown as a reciprocative piston engine 62 with its pressure supply pipe 50' connected to stage 1; nevertheless, this form of the invention is basically the same in operation and function as the form of the invention shown in FIGURES 1 and 2. However, in this disclosing embodiment of FIGURE 5, I show a control device 120 in detail, see FIGURE 6, which reflects the existing exhaust pressure in a sensing capacity by diaphragm 123 in chamber 125 thereof in open connection through pipe 132 with exhaust pipe 50. I may state that the diaphragm 123 and 125 would be preferably of the bellows type to give for a given back pressure variation in pipe 50 a greater degree of their displacement than the type of diaphragms as are shown.

An arm 126 contacting the under side of diaphragm 123 is displaced in accordance to the displacement of diaphragm 123 and thereby rotates shaft 128 in sleeved bearing 130 which is a composite of carbon and graphite, self-lubricating, and impervious to Freon C–318. This same type of sleeve bearing is seen at numeral 105 forming a cylinder sleeve for engine 62 as are all the bearings in engine 62, not shown.

Now, when arm 126 is displaced, it also displaces arm 127 which is also secured to shaft 128. However, arm 127 is offset linearly on shaft 128 to permit a gland to be interposed around shaft 128 to seal chamber 121' from chamber 121. Chamber 121' is vented to atmosphere by vent hole 122' and chamber 122 is likewise vented to atmosphere by a second vent hole 122'. In this manner, the displacement of diaphragm 123 also displaces diaphragm 124, overcoming the biased adjustable spring 162', the spring 162' being adjusted as to its degree of bias by the threaded engagement on the stem of handle 162. As diaphragm 124 is displaced upwardly, it enlarges chamber 121 in a degree controlled by adjusting handle 162.

I also provide in FIGURE 5 as in FIGURE 2 a temperature sensing finger 17 which heats a thermosatic responsive fluid, like the fluid called in industry "Dowtherm" which actuates thereby fuel valve 14 in FIGURE 2 via pipe 46 by a thermostatic fluid reservoir in 18. Now, as pipe 47 is also joined in open circuit to thermostatic fluid reservoir 18 and pipe 47 connects into chamber 121, see FIGURE 6, the enlargement of chamber 121 by the displacement of diaphragm (bellows) 124 increases the volume of chamber 121 filled with Dowtherm liquid. The enlargement of chamber 121 is the equivalent of sensing finger 17 reflecting a lowering of temperature of the working fluid entering pipe 50. Thus the actuating thermostatic pressure in reservoir 18 is reduced as effected by the agency of chamber's 121 enlargement. This causes the fuel control valve 14 to open and supply to burner nozzle 13 a greater fuel supply which in turn increases the mean of the temperature gradient in heat contacting relation with the thermal compressor 1 and thereby increases its dilation factor in unit time, to accommodate a greater displacement of working fluid in transit therethrough due to an increase of pulse frequency because of the increased rate of dilation of the working fluid in the thermal compressor. Thus it dictates the quickened rise of pressure in stage after stage in respect to the withdrawal of the volume of working fluid in unit of time.

A system of priming one or more stages of the compressor 1 when starting dead cold is shown in FIGURE 5. A reserve working fluid tank 36 is so positioned to absorb exhaust temperature from the system's heat source, the idea being that there be a reserve reservoir 36 of working fluid at a temperature above a cold compressor, heated by an electric resistance element 157 at a coincident time when the ignition switch and combustible supply to pipe 16 are started, so that with a pressure available by the heating factor of heater 157 the pressure of the working fluid in reservoir 36 would be adequate for priming by the opening of valve 54 in FIGURE 5 whereupon gaseous working fluid will enter the 1st, 2nd and 3rd stages of the compressor.

Again assuming respective temperatures at different points of the invention, as seen in FIGURE 5, are at normal operative temperature, the positioning of the reserve tank 36 in the stack exhaust temperature as within stack outlet 37, an intermediate temperature zone in reservoir 36 is attained whereby no pumping apparatus is required to permit a charging of the closed cycle with additional working fluid to increase its density via pipe 33' by opening valve 35 to pipe 33 and thus into the low temperature stage *n*, or conversely, to quickly reduce the density of the working fluid as thus increased, then by the opening of valve 34, seen connected into the 1st stage by pipe 53 and thereby returning the working fluid, by the decided difference of pressure, back into reserve tank 36. In other words, reserve tank 36 is located in an intermediate temperature zone between the above two extremes of temperature, stages 1 and *n*.

Insulative jacketing may be used in the different embodiments of the invention where they are beneficial, such as in FIGURE 5 at 60, or at 1' and on the supply pipe at 100 in FIGURE 7 or elsewhere.

Numeral 101 in FIGURE 7 and 29*a* as seen in section in FIGURE 1 and the pressure sealing glands about output shaft 28 are composed of self-lubricating elements supplied by the sealing industry.

The plurality of uniflow valve structures as seen in FIGURE 5 are composed of a spring or resilient member 61 formed in bow shape, the ends thereof engaging the low temperature side of the projecting valve seat 39' which on the higher temperature side form the seating faces of valves 39. The spring elements 61 are secured at their central arched apex to the center of circular valve elements 39.

In this manner is obtained a uniflow valve which, due to the large circumference of the valve seat 39', permits a large displacement of working fluid to flow from one stage to the next with a relative small movement of valve 39 off of its valve seat 39'. It is to be noted that FIGURE 5 shows this form of valve in a sectional viewing. An effort was made in FIGURE 5 to attain a highly illustrative view of a complete assembly from a functional point of view.

Consider now FIGURE 8, which is another embodiment of the invention, especially adapted to the propulsion of vehicles for land, sea and air.

Where sudden high power demand is necessary to give rapid acceleration, I employ one or more positive actuated valves, these valves are actuated by a source, such as a storage battery, or the like as an independent powered source.

In doing this, I attain a greater positive and timed control of the essential pulsing rate, which, however, can never exceed in volume as passed therethrough said valve system, the dilation gain in volume of the working fluid, in unit time, without a loss of pressure generation to the usage system while the working fluid is in transit along the thermal gradient of the invention.

Therefore, in FIGURE 8, I coordinate numeral 65, the positive actuated valve, and 68, its driving gear as rotated by pinion 69 of motor 66 which is in turn varied in its r.p.m. by rheostat 9, which increases the pulsing rate as formed by the variable speed of valve 65 with the burner nozzle's control valve numeral 14, as seen in FIGURE 2, and which is actuated by link 77 through arm 161' of hub 76 by the depression of foot pedal 75 as seen in FIGURE 7. Note, the burner nozzle 13 in combustion chamber 2 is only shown in FIGURE 7.

In this manner in full or greater degree by the depression of pedal 75, I increase the mean temperature of said impressed heat gradient on to said heating ducts, stages 1 to 3, FIGURE 7, which determine the dilation factor.

Referring again to FIGURE 7, it is seen that a positive actuated pulse-dictating valve numeral 65 in FIGURE 7 is illustratively shown in the final or high temperature and high pressure stage 1. However, this single positive actuated valve does not preclude the teaching of such a valve as numeral 65 in any or all of any number of stages in the compressor.

It is seen in FIGURE 8 that the pulse-forming valve 65 is shown in tapered form and rotates in a bearing sleeve 85 of a carbon-graphite composite which has an exceedingly low coefficient of friction, requiring no oil lubrication. The stem 67 of valve 65 is of such a diameter that the area of valve 65 at its top is designed to be slightly greater than the area of said valve's bottom area when the area of valve stem 67 is subtracted from the valve's top area as the stem 67 passes through gland 84 to atmosphere. An intercommunicating port 80' maintains an equal operating pressure on both ends of said tapered valve 65.

Valve 65 has two through-flow ports, one directly above the other, 102 the lower one and 103 the upper port, with registering ports in the valve seat 98 and 96 for top valve port 102, which pairs of valve seat ports are at right angles to one another.

In regard to thermal compressor 1, as seen in FIGURE 7, it is quite similar to the thermal compressor, as shown in FIGURES 1 and 2 as to its plurality of annular formed chambers or stages, but there is a difference in that stage 1 and stage 2 are bifurcated by divisional forming members 89, 90, 91 and 92, which permit each bifurcated series of stages 1 and 2 to respectively supply connecting ducts, 155 and 156, shown in dotted lines, the dual ports 102 and 103 in valve 65 being therefore in entirely separate connective relation. This arrangement enables valve 65 to rotate at a lower r.p.m. to produce an alternating pulse-flow through bifurcated stages 1 and 2 in their bifurcated divisional form which permits a longer period of dwell therein for essential dilation in respect to the number of pulse-formations by valve 65 per second. The two transfer uniflow valve cages 38' interconnect stage 3, with the bifurcated stage 2 while the two cages 38*a*' interconnect stages 2 to stages 1. The valve 65 discharges directly into intake chamber 99 to turbine 20. The base of valve 65 casing 79 is closed by closure 82.

In FIGURE 8, valve 65 is rotated through its stem 67 by gear 68 by pinion 69 on the shaft of electric motor 66. The stem 67 of valve 65 is sealed by gland 84 in the extension of valve case 79, numeral 83.

It is seen that there can be a variable rotation per minute of valve 65 through the agency of rheostat 9 in FIGURE 7. An electric supply wire 10 of motor 66 is connected to electric wire 10 from rheostat 9.

For automotive service, as in FIGURE 7, the r.p.m. of valve 65 is controlled by foot pedal 75, as the pedal is depressed in a conventional manner by the agency of gear 74 secured to hub 76 of pedal 75. Gear 74 is in mesh with pinion 73 of rheostat 9 to thereby rotate contact arm 158 over conventional resistance lead contacts 159 in rheostat 9.

At this particular degree of depression of foot pedal 75, the burner nozzle 13 in the combustion chamber 2 has been increasingly opened by operating link 77 actuated from hub 76 of gear 74, see FIGURE 7, the actual connection between link 77 and burner valve to burner nozzle 13 not shown, so that the mean temperature of the heat gradient impressed on stages 1 and 2, as bifurcated, and stage 3 is proportionally increased.

Likewise, the rotation of valve 65 is, in a predetermined degree, increased through the agency of rheostat 9.

On further depression of pedal 75 to attain higher acceleration as in passing another vehicle, the end of element 160 comes into contact with arm 161' secured to hub 76 and arm 161' displaces element 160, thereby compressing spring 138. The other end of element 160 is yoked, one end thereof actuates the reverse movement linkage of 141 to close valve 144 which commands the flow of pipe 146 from relief pressure valve 147 to pipe 148 leading to reserve reservoir 36, while in coincident movement, the other yoked end of element 160 terminates into a rack which meshes with gear 140 on the stem of valve 153 which is thereby opened, permitting a flow of working fluid via pipe 150 from reservoir 36 to flow via pipe 154 to enter into the low pressure exhaust pipe 88 and thus into the stage 3 of compressor 1.

In this manner, the closed circuit pulsing system is charged to a greater density of working fluid for a maximum of acceleration.

As and when the operator releases the above stated depression of pedal 75, the valve 144 is again opened by spring 138 to permit relief valve 147 to normally function and allow the emergency high accelerative pressure of the working fluid to re-enter into reserve reservoir 36. This flow-action is predicated on the maintenance of the temperature of reservoir 36 in an intermediate temperature range. When using Freon C–318 as the working fluid, the temperature of the reservoir 36 should be maintained in a range between 285 degrees F. and 180 degrees F. either by electric resistance element 157 in reservoir 36 or, as seen in FIGURE 5, where reservoir 36 is shown in a heating ambient of exhaust temperatures.

Continuing the return to a normal density condition of the working fluid on the above stated release of pedal 75, valve 153 is seen to be coincidently closed whereby the flow from reservoir 36 to the low pressure end of the closed cycle is terminated. The maximum pressure in the closed cycle is governed by relief valve 147 at which normal pressure a low rotative r.p.m. of positive actuated valve 65 brings the turbine r.p.m. to an idling status.

It is evident that a three or four cylinder monobloc variable cut-off engine in place of turbine 20, as seen in FIGURE 7, would be most desirable, as the variable cut-off valve system of the engine can give a high mean effective pressure during the entire expansion stroke in such an engine of full compressor pressure for high acceleration. Besides, it can be reversed so that only a clutch is required without any transmission and it is self-starting.

These power units of the invention will utilize a wide variety of cheap fuels without recourse to any octane content, as the combustion is constant, only varied in its heat generation in unit time and can be of a high order of complete combustion with high $CO_2$ content in its atmospheric exhaust without generating smog components.

To easily attain a hermetical sealed condition in the entire system, it is seen by those skilled in this art, that all valve controls, as above specified, including the valve 65, or valves 65 for any or all of said stages of the compressor can be enclosed in a casing with access through a sealed cover to attain permanent hermetical sealing.

The great factor is the big increase in thermal efficiency over the prior art, by what might be called "a thermic dilating pressure-pulsing uniflow ladder."

What I desire to protect by United States Letters Patent is as follows:

1. A closed cycle heat engine comprising a ducting circuit; a mass of working fluid in said circuit; a plurality of sequently communicating dilation chambers comprising a portion of said ducted circuit; uniflow valve means located in said duct circuit between each of said chambers; a usage device for converting a pressure drop of said working fluid along said ducting circuit into mechanical work; heat input means for maintaining a temperature gradient along said sequence of heat dilating chambers such that the temperature descends from the supply exit end to the entrance end of said chambers; and means to introduce a periodic pulsation throughout the working fluid in said circuit.

2. In an engine according to claim 1 said pressure pulsation means comprising a reciprocating piston engine utilized as said usage means.

3. In an engine acording to claim 1 said pressure pulsation means comprising at least one motor driven interrupter valve located in said fluid circuit to form said pulsations.

4. A thermal-dilation pulse-flow compressor comprising a heat source, a gaseous working fluid, a heating duct, said heating duct connected to said heat source as a thermal outlet from said source, a working fluid heating duct, said working fluid in said working fluid heating duct, said working fluid heating duct in counter-flow heat transfer relation with said heating outlet duct to thereby form a thermal gradient in said working fluid heating duct, a system of utilization of a pressurized gaseous working fluid, said system of utilization directly connected at its supply inlet to that end of said working fluid heating duct which is at the high temperature end of said heat gradient, a control valve interposed in said connection to said system of utilization, the exhaust from said utilization system in direct connection to the other end of said working fluid heating duct, to thereby form a completely closed thermal circuit therebetween, means to intermittently divide said working fluid heating duct by a series of uniflow valve means in spaced relation therein to form a plurality of gas-tight chambered divisions or pressure stages, in which normally the gaseous pressure in any specific division or stage closer to the high temperature end of said working fluid duct has a higher pressure therein than its adjacent division in a slightly lower ambient of temperature, but when said any specific valve-formed division has its pressure lowered by a degree of the opening of said control valve giving a flow-displacement therefrom to said system of utilization, said released flow draws off a portion of the volume of said heated working fluid from said specific division and the pressure in said specific chambered division in said higher temperature ambient falls momentarily below the pressure in said adjacent division in a slightly lower temperature ambient causing said interconnecting uniflow valve to open, and a portion of said working fluid in said adjacent division flows into said specific division and into said higher temperature ambient until there is no valve actuating pressure differential between said divisions, whereupon said uniflow valve closes, and thus said opening and closing of said uniflow valves in said series of valves initiates a pulsed-flowing in said working fluid heating duct which pulsing flow is triggered from one adjacent division to the next, causing a flow-current always intermittently moving into a higher temperatured ambient towards the high temperature end of said working fluid duct caused by the demand of a pressurized working-fluid flow into said utilization system.

5. The text of claim 4 and an automatic control valved system for said heat source, thermostatic operative means responsive to the temperature of said working fluid as supplied to said utilization system to control the degree of heat generated by said heat source to attain a proper thermal expanded volume of said working fluid in said compressor in respect to the volume of said working fluid necessary to supply said utilization system at a desired pressure.

6. The text of claim 4 and a working fluid supply reserve source, a dualed system of valved controlling means in connection with said pressurized working fluid reserve source, the first of said dual control valved systems in connection between said working fluid reserve source and an outlet positioned in close proximity to said high temperature end of said working fluid heating duct, a control valve in said connection to permit a volume of said working fluid to be returned to said working fluid reserve source from said closed circuit system as and when said control valve is opened due to the pressure differential existing between that in said outlet and said reserve working fluid supply source in terms of their respective relative temperature, the second of said dualed valved systems being in connection at the exhaust receiving end of said thermal compressor with said reserve supply source of said working fluid, and valve means therein to permit the re-entry of said working fluid from said working fluid reserve supply source to flow into said exhaust connection by their respective pressure differentials to thereby control a desired density of said working fluid in said thermal closed circuit.

7. The text of claim 4 and means to maintain the temperature of said working fluid reserve supply source in an intermediate temperature point between the temperature of the outlet supply of said working fluid heating duct and the temperature of the working fluid at the opposite end of said heating duct at its exhaust receiving end of said thermal compressor.

8. A combined heat-dilating pulse-flow compressor and its heating source comprising a gaseous working fluid, a system of utilization, a plurality of serially positioned heat absorbing chambers, a casing therefor, said casing connected to said heat source as its heat outlet, said casing in heat interchange relation with said plurality of heat absorbing chambers with the heating fluid flowing in normal counter-flow relation to the working fluid, that end of said plurality of serially positioned heat absorbing chambers exposed to a high temperature ambient from said casing being connected as a supply source to said system of utilization, while the exhaust from said system of utilization is in direct connection to that end of said series of chambers exposed to a low temperature ambient from said heat source, a differential pressure actuated uniflow series of valves, each of said valves in interconnecting position between each of said plurality of chambers, all of said valves adapted to open in uniflow relation towards said high temperature end of said plurality of serially positioned heat absorbing chambers, a control valve in said supply connection to said system of utilization whereby when said control valve is closed and no supply flow of said working fluid can pass into said system of utilization, all of said differential pressure actuated uniflow valves being closed whereas when said control valve is opened, then said uniflow valve interconnecting the last of said plurality of chambers with its adjacent chamber on the high temperature end of said series of chambers is periodically opened as and when the volume of working fluid in passing through said opened control valve to supply said utilization system lowers the pressure in said last of said plurality of chambers to that extent to open said uniflow valve interconnecting said chamber with its adjacent chamber in said series, thus permitting a flow of working fluid to enter said terminal chamber and temporarily raise said pressure in said last chamber to be further dilated by entry into higher temperature ambient and thereby closing said interconnecting uniflow valve, this intermittent flow between said two chambers being induced by a flow of working fluid to said usage system triggering a consequent pulsing pressure-flow in a timed sequence through the remainder of said chambers to afford a working fluid displacement in unit time to accommodate the required pressure-volume flow of said working fluid to supply said utilization system, provided that the magnitude of heat interchange in unit time between said series of heat absorbing chambers and said heat conducting casing is sufficient to maintain a capacity of pressure generated dilation of said working fluid therein to attain a necessary periodicity of pulsing-flow through said series of intermittently interconnected chambers in respect to the volume of pressurized working fluid withdrawn in unit time to supply said utilization system.

9. The text of claim 8, a thermostatically operative control system to control said heat source in accordance with a necessary minimum of temperature of said working fluid, inasmuch as the higher the temperature of said working fluid delivered to said utilization system, the greater the periodicity of pulsed-flow through said heat absorbing chambers caused by a comparable greater degree of dilation of said working fluid in a unit of time while in transit through said heat-dilating compressor.

10. The text of claim 8 and a plurality of automatic pressure differential actuated uniflow valves in series flow interconnection between each adjacent heat absorbing chamber to thereby increase the flow-rate and reduce the friction flow of said working fluid during said periodicities of pulse-flow.

11. A thermal dilating pulsing-flow compressor comprising a heat source, a gaseous working fluid, a working fluid heating path, means to heat said working fluid heating path by a counter-flow heat transfer relation with said heat source, forming thereby a thermal gradient of heat transfer into said gaseous working fluid in said heat path, a system of utilization of a pressurized gaseous working fluid, said system of utilization directly connected at its supply inlet to that end of said working fluid heating path which is at the high temperature end of said heat gradient, a throttle valve interposed in said supply connection to said system of utilization, the exhaust from said system of utilization in direct connection to the other end of said working fluid heating path to thereby form a completely closed circuit, means to positively and intermittently subdivide said working fluid heating path into a plurality of gas-tight subdivisions of thermal dilating chambers, so that normally the gaseous presssure in any one of said thermal dilating chambers is higher than the pressure in the adjacent dilating chamber in the next lower heating ambient thereto, but when said usage system demands by a degree of opening of said throttle valve a volume of pressurized gaseous working fluid flows into said utilization system and the pressure in the adjacent lower ambient chamber becomes momentarily higher than the pressure in said chamber which normally had a higher pressure of said working fluid, whereupon said positive subdividing means is temporarily nullified and the two adjacent chambers under consideration have a momentary interchange of working fluid-flow in a direction into the chamber positioned in the higher thermal ambient, such that a periodic subdivision and then an interchange of volume of working fluid by their respective terms of pressure differentials always flows into a chamber in a higher gradient of temperature as and when induced by a usage-flow from the high temperature end of the compressor into said system of utilization, likewise the exhaust fluid from the system of utilization enters the low temperature end of said compressor's subdivision in its lowest temperature ambient to complete said uniflowing of said working fluid in said closed circuit.

12. A thermal dilating pulsing-flow compressor in closed circuit relation with a usage system comprising a gaseous working fluid, a heat source to heat said fluid, valve means to control said heat source, a plurality of chambered receptacles, means to initially charge said receptacles with said gaseous working fluid, means to convey heat from said heat source, said conveying heating means in counter-flow heating relation with the flow of said gaseous working fluid within said plurality of receptacles, said receptacles interconnected in series relation by uniflow valve means positioned between each receptacle in said series, whereby one end of said series of receptacles are exposed to a relatively high temperature heat gradient from said heat source as compared to the other end of said series, said uniflow valves adapted to open towards said high temperature end of said series of receptacles, a pressurized working fluid usage system, said usage system in supply connection with said high temperature end of said series of receptacles, the exhausted working fluid from said usage system in direct connection with the low temperature gradient end of said series of receptacles, a working fluid throttle valve in said supply connection to said usage system, whereupon when said throttle valve is opened to a degree, the pressure of said pressurized dilated working fluid in the terminal receptacle at the high temperature and pressure end of said series of receptacles falls to a degree such as to open by the momentary pressure differential said interconnecting uniflow valve between said terminal receptacle and its adjacent receptacle in said series to permit a portion of said working fluid in a pulse-flow to enter said terminal receptacle from said adjacent receptacle whereupon the pressure differential which opened said interconnecting valve ceases and said interconnecting valve closes and said admitted working fluid is further dilated in its transit through said terminal receptacle in its flow to said controlling throttle valve, this periodic opening and closing of said interconnecting uniflow-valve generating said pulsed-flow of said working fluid being predicated on the volume in unit time of working fluid as supplied to said usage system by the degree of opening of said control throttle valve in respect to the rate of thermal dilation of said working fluid which involves as well the area of the heating surfaces of said receptacles and the degree of the temperature gradient of said heat to which said receptacles are in heat exchanging relation and also the density and volatility of said working fluid, this pulsing-flow between said terminal receptacle and said adjacent receptacle triggering a similar periodical pressure differential down through said series of valve interconnected receptacles to permit an intermittent displacement of pressurized working fluid to be supplied to said usage, the entry of said exhaust volume from said usage system entering said receptacle at the relatively lowest temperature end of said series of uniflow valved interconnected receptacles to complete said thermally closed pulsing cycle.

13. The text of claim 12 and a positively and independently actuated valve positioned at the supply outlet of said terminal receptacle which valve's variable rate of opening and closing generates a timed pulsing flow through said series of receptacles in accordance therewith and the said positively operated valve is coordinated with said valve to control said heat source whereby when said usage system demands a greater volume of pressurized working fluid the rate of said valve's opening and closing is increased as well as the rate of dilation in unit time of said working fluid by the increased temperature gradient impressed on said series of receptacles by the greater degree of opening of said control valve of said heat source.

14. The text of claim 11 and means to change the initial density of said working fluid in said thermal compressor to thereby increase the heat-transfer factor as exists in said compressor and thus to increase its dilation in unit time to meet a greater volume and pressure demand from said usage system.

15. The text of claim 12 and means to positively and independently operate said interconnecting series of uniflow valves interposed between said series of receptacles in a sequential timed action in respect to their position in said thermal gradient and to increase their rate of opening and closing in respect to the greater degree of opening of said valve controlling said heat source.

16. The text of claim 12 and means to coordinate the throttle valve and interconnecting uniflow valve between the terminal receptacle and its adjacent receptacle which increases or decreases the density of said working fluid just after said control means is increased and means to reduce said density to a normal density when said control means is decreased to its idling position.

17. A thermal dilated pulsing-flow compressor in closed circuit relation with a usage system comprising a gaseous working fluid, a heat source to heat said fluid, a plurality of chambered receptacles, means to initially charge said receptacles with said gaseous working fluid, means to convey heat from said heat source, said heating means in counter-flow heating relation with the flow of gaseous working fluid within said plurality of receptacles, whereby one end of said series of receptacles is exposed to a relatively high temperature from said heat source as compared to the other end of said series, said receptacles interconnected in series relation by uniflow valves positioned between each receptacle in said series, said valves adapted to open toward said high temperature heated end of said series of receptacles, a usage system, said system to be usefully supplied with said working fluid when in a heated and thermally dilated and pressurized state, connecting means to connect said high temperature end of said series of receptacles with said usage system, the exhausted working fluid from said usage system in direct connection with the relative low temperature end of said series of receptacles, a working fluid control valve in said supply pipe connecting between said usage system and said high temperature end of said series of heated receptacles, whereupon when said control supply valve is opened, the pressure falls in the terminal vessel at the extreme high temperature gradient end of said series of receptacles to a degree to open said interconnecting uniflow valve connecting said terminal receptacle with its adjacent receptacle by a pressure differential therebetween to permit a portion of said working fluid in a pulse-flow to enter said terminal vessel from said adjacent receptacle, the closing of said interconnecting valve occurring when the pressure of said working fluid entering said terminal receptacle has lowered the pressure in said adjacent receptacle in respect to the pressure in said terminal receptacle, this periodic opening and closing of said interconnecting uniflow valve to generate said pulse-flow being predicated on the volume supply of working fluid drawn off in unit time from said terminal receptacle as coordinated by the rate of dilation of said working fluid in unit time which rate of dilation involves the size of said receptacles, the ambient of temperature to which they are exposed and the volatility of said working fluid, this above described pulse-flow between said terminal receptacle and said adjacent receptacle triggering a similar momentary and periodical pressure differential down through said series of receptacles, as interconnected by said uniflow valves to permit the entry of said exhaust from said usage system to enter said receptacle at the relatively lowest temperatured end of said series of receptacles in their gradient of temperature.

18. A thermal dilation pulsing-flow compressor comprising a working gaseous fluid, a cylindrical combustion chamber, means to maintain a combustion in said combustion chamber, a plurality of ring shaped chambers having their respective annular walls in common one to the other in said plural series surrounding said combustion chamber, starting from said ring shaped chamber adjacent to said combustion chamber each alternating ring shaped chamber thereto being interconnected by a uniflow valve, each valve directing the flow therethrough from the outermost ring shaped chamber to the innermost chamber in series relation, manifolds connecting said combustion chamber in series relation with the intervening ring shaped chambers whereby to form a counter-flow relation between said working fluid in said uniflow interconnected series of ring shaped chambers and the heat flow arising from said combustion chamber and flowing through said manifolds through said intervening chambers; a usage system, a high temperature and pressure outlet positioned in said innermost ring shaped chamber connected in supply relation with said usage system and an inlet in the outermost uniflow valve connected series of ring shaped chambers to receive the exhaust from said usage system in a closed circuit relation.

References Cited in the file of this patent

UNITED STATES PATENTS

| | | |
|---|---|---|
| 829,810 | Swan | Aug. 28, 1906 |
| 1,994,009 | Vorkauf | Mar. 12, 1935 |